(12) United States Patent  
Arimatsu (10) Patent No.: US 9,297,273 B2
(45) Date of Patent: Mar. 29, 2016

(54) COOLING JACKET INCLUDING A GROOVE UNIT THROUGH WHICH COOLING MEDIUM PASSES, STATOR INCLUDING A COOLING JACKET, AND ROTARY ELECTRIC MACHINE INCLUDING A COOLING JACKET

(71) Applicant: FANUC CORPORATION, Minamitsuru-gun, Yamanashi (JP)

(72) Inventor: Yohei Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 108 days.

(21) Appl. No.: 14/187,915

(22) Filed: Feb. 24, 2014

(65) Prior Publication Data

US 2014/0241865 A1  Aug. 28, 2014

(30) Foreign Application Priority Data

Feb. 26, 2013  (JP) .................................. 2013-036061

(51) Int. Cl.
*H02K 5/20* (2006.01)
*F01D 25/12* (2006.01)

(52) U.S. Cl.
CPC  *F01D 25/12* (2013.01); *H02K 5/20* (2013.01); *Y10T 29/49316* (2015.01)

(58) Field of Classification Search
None
See application file for complete search history.

(56) References Cited

U.S. PATENT DOCUMENTS 7,531,924 B2 * 5/2009 Kwon et al. .................... 310/52

FOREIGN PATENT DOCUMENTS

| JP | H03-150048 A | 6/1991 |
| JP | 11-069672 | 3/1999 |
| JP | 2008-527955 A | 7/2008 |
| JP | 2009-017777 | 1/2009 |
| JP | 2011-015578 | 1/2011 |
| WO | WO 2012/156104 A1 | 11/2012 |

OTHER PUBLICATIONS

First Japanese Office Action mailed Jul. 1, 2014 relating to Japanese Application No. 2013-036061 (w/English Translation).

* cited by examiner

*Primary Examiner* — Tran Nguyen
(74) *Attorney, Agent, or Firm* — RatnerPrestia (57) ABSTRACT

A cooling jacket capable of improving production efficiency. The cooling jacket includes a tubular main body having a first end face and a second end face, and a groove unit defining a flow channel of a cooling medium successively disposed axially on an outer periphery of the main body. The cooling jacket includes no portion located radially outward from a bottom of the groove unit between a first end portion of the groove unit located on the axial rear side of the main body and the first end face of the main body.

10 Claims, 10 Drawing Sheets

COOLING JACKET INCLUDING A GROOVE UNIT THROUGH WHICH COOLING MEDIUM PASSES, STATOR INCLUDING A COOLING JACKET, AND ROTARY ELECTRIC MACHINE INCLUDING A COOLING JACKET

BACKGROUND OF THE INVENTION

1. Field of the Invention

The present invention relates to a cooling jacket including a groove unit through which a cooling medium passes to cool a stator of a rotary electric machine, a stator including the cooling jacket, and a rotary electric machine including the cooling jacket.

2. Description of the Related Art

When a rotary electric machine such as an electric motor or an electric generator is driven for example, a stator generates heat due to factors such as iron loss and the like. A configuration is known where, in a rotary electric machine, a cooling jacket including a groove that defines a flow channel through which cooling medium passes is fitted into a radial outside of the stator to cool a stator that has generated heat (For example, refer to Japanese Laid-open Patent Publication No. 2011-15578).

In a rotary electric machine including a cooling jacket as described, it is specifically desirable to improve the production efficiency of the cooling jacket.

SUMMARY OF THE INVENTION

In a first aspect of the present invention, a cooling jacket includes a tubular main body having a first end face of an axial rear side and a second end face of an axial front side, the main body being disposed on a radial outside of a stator of a rotary electric machine; and a groove unit defining a flow channel of a cooling medium successively disposed axially on an outer periphery of the main body, wherein the cooling jacket includes no portion located radially outward from a bottom of the groove unit between a first end portion of the groove unit located on the axial rear side of the main body and the first end face of the main body.

The cooling jacket may include a cylindrical outer peripheral region having an outer radius equal to or smaller than a radial distance between the bottom of the groove unit and a center axis of the main body, between the first end portion of the groove unit and the first end face of the main body.

The cooling jacket may include a cylindrical outer peripheral region having an outer radius equal to or smaller than the radial distance between the bottom of the groove unit and the center axis of the main body, between a second end portion of the groove unit located on the axial front side of the main body and the second end face of the main body.

The cooling jacket may include a cylindrical outer peripheral region having an outer radius larger than the radial distance between the bottom of the groove unit and the center axis of the main body, between the second end portion of the groove unit located on the axial front side of the main body and the second end face of the main body.

In a second aspect of the present invention, a cooling jacket includes a tubular main body having a first end face of an axial rear side and a second end face of an axial front side, the main body being disposed on a radial outside of a stator of a rotary electric machine; and a groove unit defining a flow channel of a cooling medium successively disposed axially on an outer periphery of the main body, wherein the groove unit extends to at least either the first end face or the second end face of the main body.

The groove unit may successively extend axially on the main body in a spiral manner. Further, the groove unit may be a multi-tread groove unit. Further, the groove unit may be formed by hobbling.

In a third aspect of the present invention, a stator includes the aforementioned cooling jacket. In a fourth aspect of the present invention, a rotary electric machine includes the aforementioned stator.

In a fifth aspect of the present invention, a production method is a method for producing a cooling jacket disposed on a radial outside of a stator of a rotary electric machine, the method including steps of preparing a tubular main body including a first end face of an axial rear side and a second end face of an axial front side; rotating the main body around a center axis of the main body; pressing a rotating hob against an outer periphery of the main body; and moving the rotating hob axially relative to the main body between a first end portion of the axial rear side of the main body and a second end portion of the axial front side of the main body to form a groove unit defining a flow channel of a cooling medium, the groove unit being successively disposed axially on the outer periphery of the main body.

The production method may further include step of cutting the main body from the first end face of the main body to a predetermined axial position before pressing the rotating hob to form a cylindrical outer peripheral region having an outer radius equal to or smaller than a radial distance between a bottom of the groove unit and a center axis of the main body.

The production method may further include a step of cutting the main body from the first end face of the main body to a predetermined axial position after forming the groove unit in order to form a cylindrical outer peripheral region having an outer radius equal to or smaller than the radial distance between the bottom of the groove unit and the center axis of the main body.

BRIEF DESCRIPTION OF THE DRAWINGS

The aforementioned or other objects, features, and advantages of the present invention will become more apparent based on the following preferred embodiments with reference to the accompanying drawings in which.

DETAILED DESCRIPTION

Figure 1:
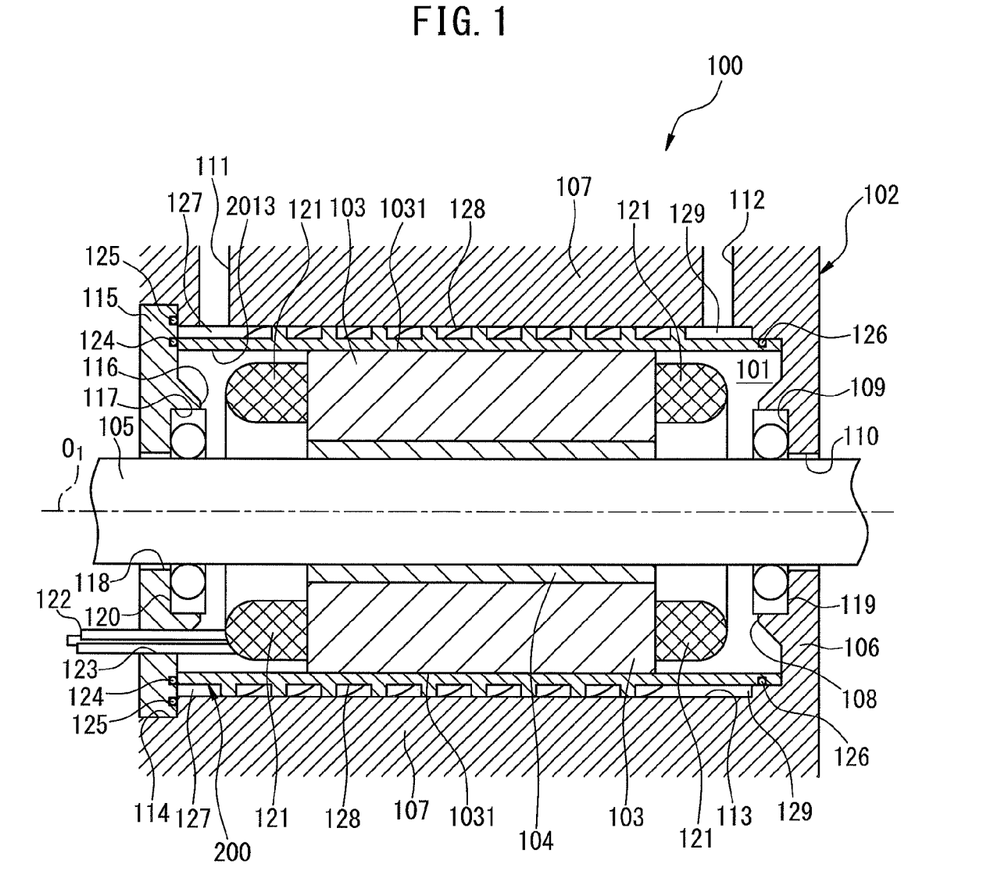
FIG. 1 is a cross-sectional view of an electric motor according to one embodiment of the present invention.

The embodiments of the present invention will now be described in detail based on the drawings. First, with reference to FIG. 1, a configuration of an electric motor 100 according to one embodiment of the present invention will be described. In the following description, the axial center direction of a rotary shaft of an electric motor is designated as an axial direction, and the left side of the sheet plane and the right side of the sheet plane of FIG. 1 are designated as an axial front side and an axial rear side, respectively.

The electric motor 100 includes a housing 102 having a columnar inner space 101, a stator 103 fixed to the inner space 101 of the housing 102, a rotor 104 rotatable disposed on the radial inside of the stator 103, and a rotary shaft 105 fixed to the rotor 104 on the radial inside of the rotor 104.

The housing 102 includes an end wall portion 106 located in an axial rear end and a cylindrical side wall portion 107 extending toward an axial front side from the end wall portion 106. The end wall portion 106 includes a recess 109 disposed so as to be recessed inward from an end face 108 of the axial front side of the end wall portion 106 and a hole 110 disposed coaxially with the recess 109 so as to penetrate through the end wall portion 106. The side wall portion 107 includes a cooling medium inlet 111 for receiving an inflow of a cooling medium and a cooling medium outlet 112 for discharging the cooling medium. The cooling medium inlet 111 is connected to a supply source (not illustrated) of the cooling medium, and the cooling medium is introduced into the electric motor 100 from the supply source via the cooling medium inlet 111. Further, the cooling medium outlet 112 is connected to a recovery unit (not illustrated) of the cooling medium and the cooling medium is discharged from the electric motor 100 via the cooling medium outlet 112. The cooling medium inlet 111 and the cooling medium outlet 112 will be described later.

In an end portion of the axial front side of the side wall portion 107 of the housing 102, a ring-shaped recess 114 recessed radially outward from an inner periphery 113 of the side wall portion 107 is formed. A disk-shaped end plate 115 is fitted into the recess 114 so as to seal the inner space 101. The inner space 101 is defined by the end wall portion 106 and the side wall portion 107 of the housing 102 and the end plate 115.

The end plate 115 includes a recess 117 disposed so as to be recessed inward from an end face 116 of an axial rear side of the end plate 115 and a hole 118 disposed coaxially with the recess 117 so as to penetrate through the end plate 115. The end plate 115 is fixed to the side wall portion 107 of the housing 102 using a fastener such as a bolt.

The rotary shaft 105 is a columnar member that extends axially having an axial center $O_1$. The rotary shaft 105 is configured to pass through the hole 110 of the end wall portion 106 in the axial rear side and is rotatable supported by a bearing 119 fitted into the recess 109 of the end wall portion 106. Further, the rotary shaft 105 is configured to pass through the hole 118 of the end plate 115 in the axial front side and is rotatable supported by a bearing 120 fitted into the recess 117 of the end plate 115.

An outer periphery of the rotary shaft 105 is fixedly provided with the rotor 104 made of a magnetic material. The stator 103 is disposed on the radial outside of the rotor 104. A coil 121 is wound around an outer face of the stator 103. A power line 122 electrically connected to the coil 121 is pulled out from the stator 103 and connected to a power source (not illustrated) disposed outside the electric motor 100 through a hole 123 provided in the end plate 115.

When current flows from the power source to the coil 121, the stator 103 generates a rotating magnetic field around the axial center $O_1$. The rotating magnetic field generated by the stator 103 causes the rotor 104 to receive a circumferential electromagnetic force, and the rotor 104 rotates together with the rotary shaft 105.

Figure 2:
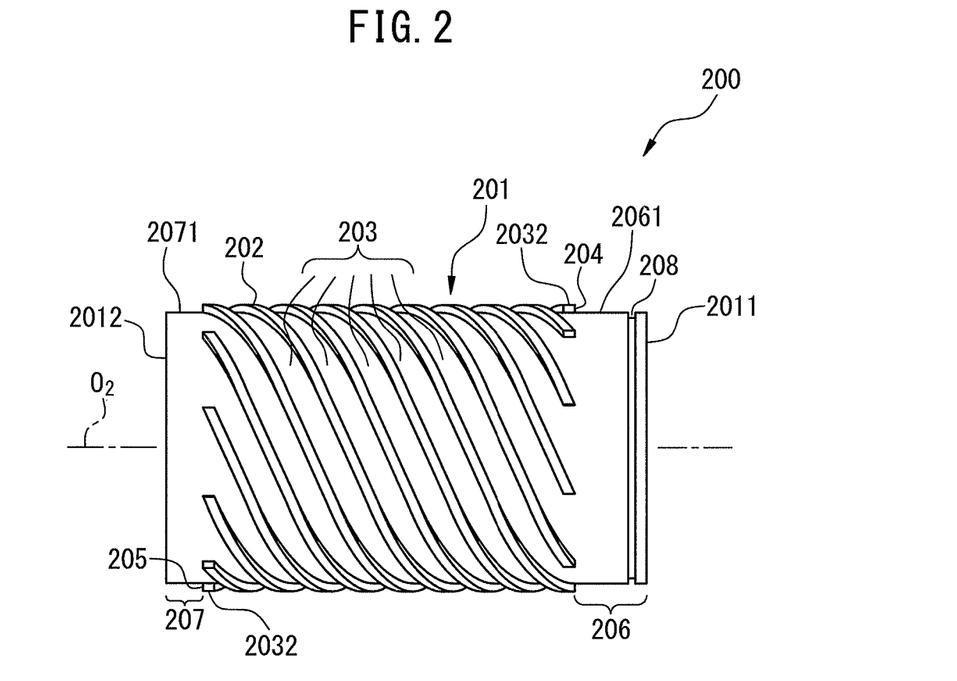
FIG. 2 is a side view of a cooling jacket illustrated in FIG. 1.
Figure 3:
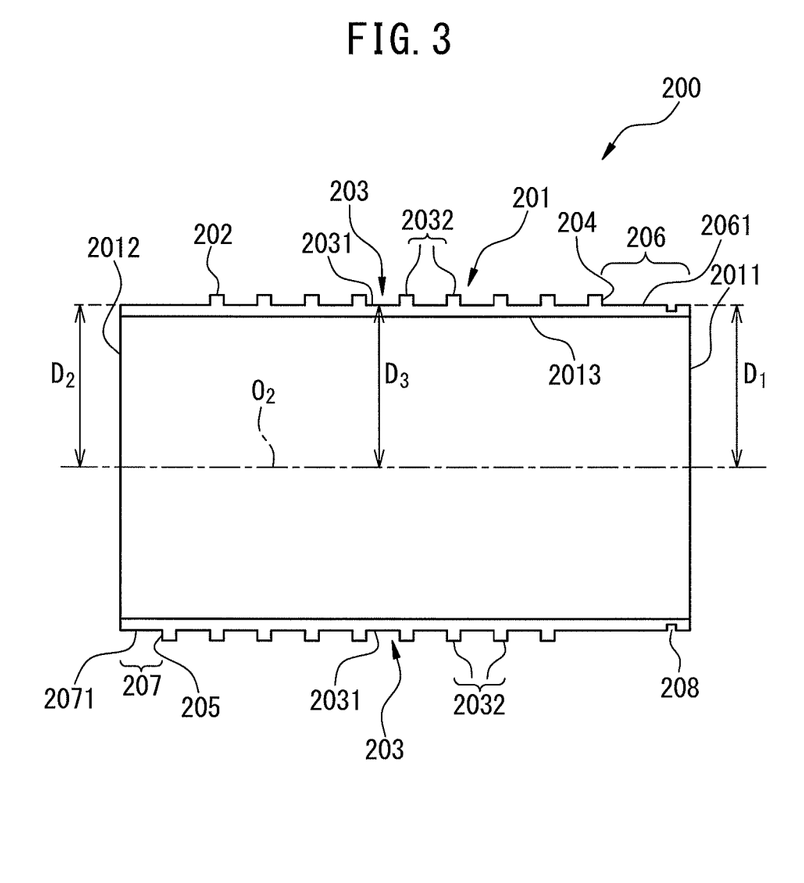
FIG. 3 is a cross-sectional view of the cooling jacket illustrated in FIG. 1.

The electric motor 100 according to the present embodiment includes a cooling jacket 200 for cooling the stator 103. In the following, the cooling jacket 200 is described in detail with reference to FIG. 1 to FIG. 3. As illustrated in FIG. 2 and FIG. 3, the cooling jacket 200 includes a tubular main body 201 having a center axis $O_2$ and a groove unit 203 formed so as to be recessed radially inward from an outer periphery 202 of the main body 201. The main body 201 is produced by using, for example, a metal material and includes a first end face 2011 of an axial rear side and a second end face 2012 of an axial front side.

In the present embodiment, the groove unit 203 is formed with an eight-thread spiral groove, and each groove in the groove unit 203 having a total of eight threads successively extends in a spiral manner from a first groove end portion 204 of the axial rear side to a second groove end portion 205 of the axial front side. More specifically, each groove in the groove unit 203 is defined by a bottom 2031 of the groove unit 203 and wall faces of two protruding threads 2032 adjacent to each other. Each of the protruding threads 2032 protrudes radially outward from the bottom 2031 of the groove unit 203 and successively extends axially from the first groove end portion 204 to the Second grove end portion 205 in a spiral manner.

In the present embodiment, the first groove end portion 204 of the groove unit 203 is defined by an axial rear end of the protruding thread 2032 defining the groove unit 203. Similarly, the second groove end portion 205 of the groove unit 203 is defined by an axial front end of the protruding thread 2032 defining the groove unit 203. Each groove of the groove unit 203 is circumferentially arrayed in the main body 201 at equal intervals. The groove unit 203 defines a flow channel through which a cooling medium for cooling the stator 103 passes. Functions of the cooling jacket will be described later.

The cooling jacket 200 is fitted into the radial outside of the stator 103 in an interference-fit manner so that an inner periphery 2013 of the main body 201 and an outer periphery 1031 of the stator 103 are pressed into contact with each other. Further, the cooling jacket 200 is fixed to the end plate 115 using a fastener such as a bolt and the like.

As illustrated in FIG. 1, an O-ring 124 that is produced by using rubber for example, is disposed between the cooling jacket 200 and the end plate 115 to seal a gap between the cooling jacket 200 and the end plate 115 with the O-ring 124. Further, an O-ring 125 is disposed between the end plate 115 and the end wall portion 107 of the housing 102 to seal a gap between the end plate 115 and the housing 102 with the O-ring 125.

The cooling jacket 200 is inserted in the inner space 101 so that the outer periphery 202 of the main body 201 and the inner periphery 113 of the housing 102 are pressed into contact with each other. Thereby, the groove unit 203 formed in the cooling jacket 200 and the inner periphery 113 of the housing 102 define a flow channel 128 through which a cooling medium passes.

In the cooling jacket 200 according to the present embodiment, the main body 201 includes a first end region 206 where no groove unit is formed between the first groove end portion 204 of the groove unit 203 and the first end face 2011 of the main body 201. On the other hand, the main body 201 includes a second end region 207 where no groove unit is formed between the second groove end portion 205 of the groove unit 203 and the second end face 2012 of the main body 201.

In the first end region 206, a recess 208 recessed radially inward from an outer periphery 2061 of the first end region 206 is formed, and the recess 208 extends circumferentially over the entire circumference of the main body 201. As illustrated in FIG. 1, in a state where the electric motor 100 has been assembled, the cooling jacket 200 is disposed so that the center axis $O_2$ of the main body 201 and the axial center $O_1$ of the rotating shaft 105 accord with each other. Then, an O-ring 126 is inserted in the recess 208 to seal a gap between the cooling jacket 200 and the housing 102.

Next, with reference to FIG. 1 to FIG. 3, operations of the electric motor 100 according to the present embodiment will be described. As has been described above, when the electric motor 100 is driven by current flowing from the power source to the coil 121, the stator 103 gradually generates heat. In this case, in order to cool the stator 103, a cooling medium is introduced thereto from the supply source of the cooling medium via the cooling medium inlet 111.

The introduced cooling medium flows in a space 127 defined between the inner periphery 113 of the housing 102 and an outer periphery 2071 of the second end region 207 of the main body 201. Subsequently, the cooling medium passes axially backward through the cooling medium flow channel 128 defined by the groove unit 203 and the inner periphery 113 of the housing 102.

As has been described above, since the stator 103 is in pressure contact with the inner periphery 2013 of the cooling jacket 200, the heat having been generated in the stator 103 is conducted to the cooling jacket 200. The heat having been conducted to the cooling jacket 200 is eliminated by the cooling medium passing through the cooling medium flow channel 128. In this manner, the stator 103 may be cooled by causing the cooling medium to pass through the cooling medium flow channel 128.

The cooling medium having passed through the cooling medium flow channel 128 then flows in a space 129 defined between the inner periphery 113 of the housing 102 and the outer periphery 2061 of the first end region 206 of the main body 201. Then, the cooling medium is discharged to the cooling medium recovery unit via the cooling medium outlet 112 communicating with the space 129.

The outer periphery 2061 of the first end region 206 is formed so as to have an outer radius equal to or smaller than a radial distance between the bottom 2031 of the grove unit 203 and the center axis $O_2$ of the main body 201. Further, the outer periphery 2071 of the second end region 207 is formed so as to have an outer radius equal to or smaller than the radial distance between the bottom 2031 of the grove unit 203 and the center axis $O_2$ of the main body 201.

Specifically, as illustrated in FIG. 3, the outer radius of the outer periphery 2061 of the first end region 206 is designated as $D_1$, the outer radius of the outer periphery 2071 of the second end region 207 is designated as $O_2$, and the radial distance between the bottom 2031 of the grove unit 203 and the center axis $O_2$ of the main body 201 is designated as $D_3$. In this case, $D_1$, $D_2$, and $D_3$ are set to satisfy the relationships: $D_1 \leq D_3$ and $D_2 \leq D_3$. In the present embodiment, the outer radiuses $D_1$ and $D_2$ of the first end region 206 and the second end region 207, respectively, are substantially equal to the aforementioned radial distance $D_3$. In other words, the relationship of $D_1 \approx D_2 \approx D_3$ is established. This configuration will be described later.

Next, with reference to FIG. 2 to FIG. 5, a method for producing the cooling jacket 200 will be described. In the production method according to the present embodiment, the groove unit 203 of the main body 201 is formed by hobbing. First, in step S1, the cylindrical main body 201 including the first end face 2011 and the second end face 2012 is prepared. Then, in step S2, the main body 201 is placed in a hobbing machine and rotated around the center axis $O_2$ of the main body 201.

Figure 4:
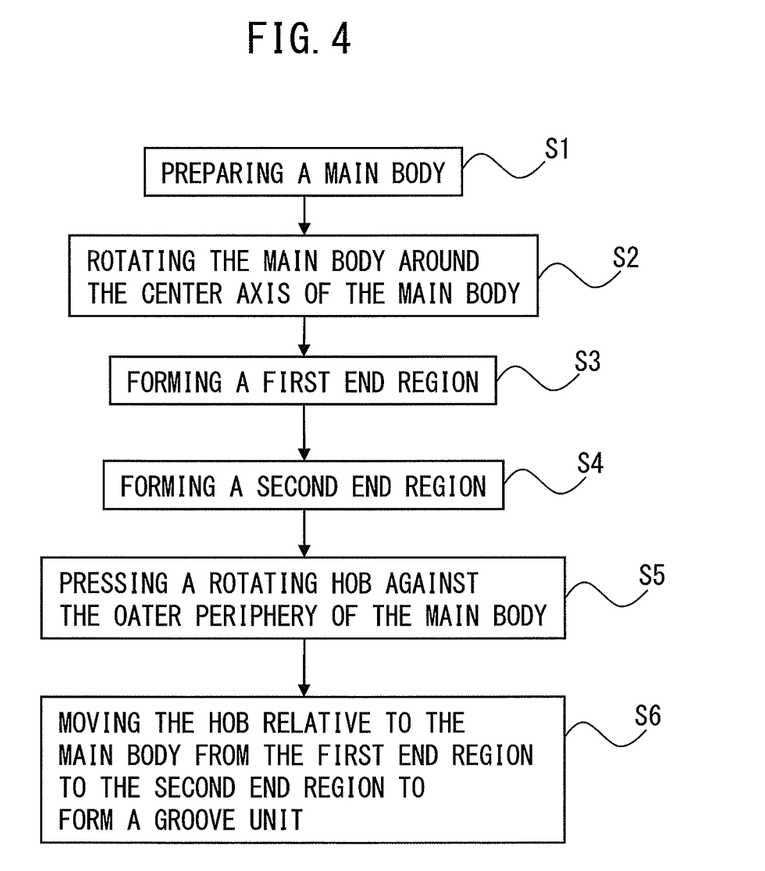
FIG. 4 is a flowchart of a method for producing a cooling jacket.

Subsequently, in step S3, the main body 201 is cut from the first end face 2011 of the main body 201 to a predetermined axial position so as to be recessed radially inward from the outer periphery 202 of the main body 201 to form the first end region 206 including the cylindrical outer periphery 2061. As has been described above, the outer periphery 2061 of the first end region 206 is formed so as to have an outer radius $D_1$ equal to or smaller than a radial distance $D_3$ between the bottom 2031 of the groove unit 203 and the center axis $O_2$ of the main body 201.

Then, in step S4, the main body 201 is cut from the second end face 2012 of the main body 201 to a predetermined axial position so as to be recessed radially inward from the outer periphery 202 of the main body 201 to form the second end region 207 including the cylindrical outer periphery 2071. As has been described above, the outer periphery 2071 of the second end region 207 is formed so as to have an outer radius $D_2$ equal to or smaller than the radial distance $D_3$ between the bottom 2031 of the groove unit 203 and the center axis $O_2$ of the main body 201.

Then, in step S5, a hob mounted in the bobbing machine is rotated and then the rotating hob is pressed against an outer periphery of the main body 201. Specifically, as illustrated in a hob 250 on the right side of FIG. 5, a top 251 of the hob 250 is pressed into contact with the outer periphery 2061 of the first end region 206.

Then, in step S6, the rotating hob is moved axially relative to the main body 201 from the first end region 206 of the main body 201 to the second end region 207 thereof to form the groove unit 203. Specifically, while the main body 201 and the hob 250 are each rotated at predetermined rates, the hob 250 is relatively axially moved forward, as illustrated by the arrow A in FIG. 5. In this manner, the groove unit 203 extending from the first groove end portion 204 to the second groove end portion 205 is formed.

As has been described above, in the cooling jacket 200 according to the present embodiment, a portion located radially outward from the bottom 2031 of the groove unit 203 is not formed between the first groove end portion 204 of the groove unit 203 and the first end face 2011 of the main body 201, or between the second groove end portion 205 of the groove unit 203 and the second end face 2012 of the main body 201. This configuration makes it possible to increase the production efficiency of the cooling jacket 200.

Figure 5:
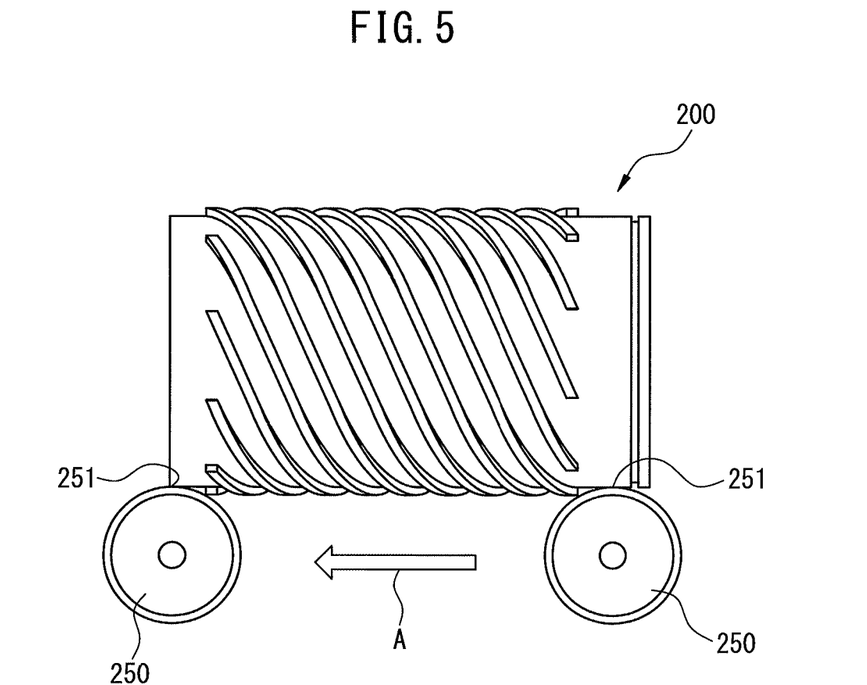
FIG. 5 is a view of the process of forming a groove unit in a cooling jacket.

This will be described in detail below with reference to FIG. 2, FIG. 3, and FIG. 5. As described in the aforementioned production method, when the groove unit 203 is formed in the main body 201 of the cooling jacket 200, the hob 250 is moved relative to the main body 201 from an axial rear side toward an axial front side of the main body 201. While the groove unit 203 is formed using the hob 250 in this manner, the top 251 of the hob 250 remains placed in a radial position of the bottom 2031 of the groove unit 203, i.e., in a position of the radial distance $D_3$ from the center axis $O_2$ of the main body 201.

As has been described above, in the cooling jacket 200 according to the present embodiment, the outer periphery 2061 of the first end region 206 and the outer periphery 2071 of the second end region 207 are formed so as to have outer radiuses $D_1$ and $D_2$, respectively, that are equal to or smaller than the radial distance $D_3$ between the bottom 2031 of the groove unit 203 and the center axis $O_2$ of the main body 201. Therefore, no portion located radially outward from the bottom 2031 of the groove unit 203 is formed between the first groove end portion 204 of the groove unit 203 and the first end face 2011 of the main body 201.

Accordingly, when a cutting tool 250, i.e., the hob 250 is relatively moved from an axial rear side toward an axial front side of the main body 201, the top 251 of the cutting tool 250 does not interfere with the main body 201 in both the first end region 206 and the second end region 207. Accordingly, the cutting tool 250 may be moved smoothly to the end portion of the axial front side of the main body 201. As a result, the groove unit 203 may be formed in the main body 201 efficiently and uniformly, making it possible to improve the production efficiency of the cooling jacket 200.

Further, according to the present embodiment, the cutting tool 250 may be prevented from colliding with a member of the cooling jacket 200 during machining. This makes it possible to prevent the cutting tool 250 from breaking, as well as damaging the cooling jacket 200.

Further, according to the present embodiment, a hob may be employed to form the groove unit 203. This makes it possible for the groove unit 203 having a larger number of threads to be formed simultaneously in the main body 201, resulting in a reduction in machining time. As a result, production efficiency may be further improved.

Further, since it is possible to form the groove unit 203 having a larger number of threads in the main body 201 in this manner, the total surface area of the grove part 203 may be increased. Therefore, the cooling performance of the cooling jacket 200 may be improved. In addition, since a depth of each groove is allowed to be shallower, a cutting amount of the main body 201 may also be reduced.

Next, with reference to FIG. 6 to FIG. 8, an electric motor 300 of another embodiment of the present invention will be described. The same signs are assigned to the same members as in the aforementioned embodiment, and detailed description will be omitted. The electric motor 300 includes a housing 102, a stator 103, a rotor 104, and a rotary shaft 105, and also a cooling jacket 400.

The cooling jacket 400 includes a cylindrical main body 401 having a center axis $O_2$ and a groove unit 403 formed so as to be recessed radially inward from an outer periphery 402 of the main body 401. The main body 401 includes a first end face 4011 of an axial rear side and a second end face 4012 of an axial front side. The groove unit 403 is formed with an eight-thread spiral groove and each groove in the groove unit 403 having a total of eight threads successively extends in a spiral manner from the first end face 4011 of the main body 401 to the second end face 4012 thereof.

Specifically, each groove in the groove unit 403 is defined by a bottom 4031 of the groove unit 403 and wall faces of two protruding threads 4032 adjacent to each other. The respective grooves in the groove units 403 are circumferentially arrayed in the main body 401 at substantially equal intervals. The groove unit 403 defines a flow channel through which a cooling medium for cooling the stator 103 passes. In the cooling jacket 400 according to the present embodiment, the groove unit 403 axially extends so as to connect to both the first end face 4011 and the second end face 4012 of the main body 401.

Next, a method for producing the cooling jacket 400 according to the present embodiment will be described. First, the cylindrical main body 401 including the first end face 4011 and the second end face 4012 is prepared. Then, the main body 401 is placed in a hobbing machine and rotated around the center axis $O_2$ of the main body 401. Then, a hob mounted in the hobbing machine is rotated and then the rotating hob is pressed against a position of the first end face 4011 in the outer periphery 402 of the main body 401. Subsequently, the rotating hob is moved axially relative to the main body 401 from the first end face 4011 of the main body 401 to the second end face 4012 thereof to form the groove unit 403.

According to the cooling jacket 400 of the present embodiment, similar to the aforementioned embodiment, a top of a cutting tool may be prevented from interfering with the main body 401 when the cutting tool is relatively moved from an axial rear side toward an axial front side of the main body 401 to form the groove unit 403. This makes it possible to form the groove unit 403 in the main body 401 efficiently and uniformly, resulting in improvement in the production efficiency of the cooling jacket 400.

Further, it is possible to prevent the cutting tool from colliding with a member of the cooling jacket 400 during machining. This makes it possible to prevent the cutting tool from breaking, as well as damaging the cooling jacket 400.

Further, according to the present embodiment, a hob may be employed to form the groove unit 403. This makes it possible to form the groove unit 403 having a larger number of threads simultaneously in the main body 401, resulting in a reduction in machining time. As a result, production efficiency may be further improved.

Further, according to the present embodiment, it is possible to form the groove unit 403 having a larger number of threads over a region ranging from the first end face 4011 of the main body 401 to the second end face 4012 thereof. This makes it possible to increase a ratio of the groove unit 403 occupying the outer periphery 402 of the cooling jacket 400, resulting in a further increase in the total surface area of the groove unit 403. As a result, the cooling performance of the cooling jacket 400 may be further improved. In addition, since a depth of each groove is allowed to be shallower, a cutting amount of the main body 401 may also be reduced.

As has been described above, in the present embodiment, a total of eight grooves in the grove part 403 are all connected to the first end face 4011 of an axial rear side of the main body 401 and the second end face 4012 of an axial front side thereof. Therefore, in the side wall portion 107 of the housing 102, a cooling medium inlet 311 for receiving an inlet of a cooling medium and a cooling medium outlet 312 for discharging the cooling medium are formed so as to communicate with each groove in the eight-thread groove unit 403.

For example, a total of eight cooling medium inlets 311 are formed in the side wall portion 107 by being circumferentially arrayed at substantially equal intervals so as to correspond to positions of the respective groove end portions 405 of the groove unit 403. These cooling medium inlets 311 make it possible to introduce a cooling medium that has been sent from the cooling medium supply source to the respective grooves of the groove unit 403.

Similarly, a total of eight cooling outlets 312 are formed in the side wall portion 107 by being circumferentially arrayed at substantially equal intervals so as to correspond to positions of the respective groove end portions 404 of the eight-thread groove unit 403. These cooling medium outlets 312 make it possible to discharge the cooling medium that has passed through the cooling medium flow channel 128 to the cooling medium recovery unit.

Further, after production of the cooling jacket 400 according to the present embodiment, the main body 401 may be cut to form the aforementioned region corresponding to the end region 206 (alternatively, the end region 207). Specifically, in the aforementioned method for producing the cooling jacket 400, after the step for forming the groove unit 403, the main body 401 is cut from the first end face 4011 (alternatively, the second end face 4012) of the main body 401 to a predetermined axial position to form a cylindrical outer peripheral region. In this case, it is possible to form the outer peripheral region so as to have an outer radius equal to or smaller than a radial distance between the bottom 4031 of the groove unit 403 and the center axis $O_2$ of the main body 401.

Figure 9:
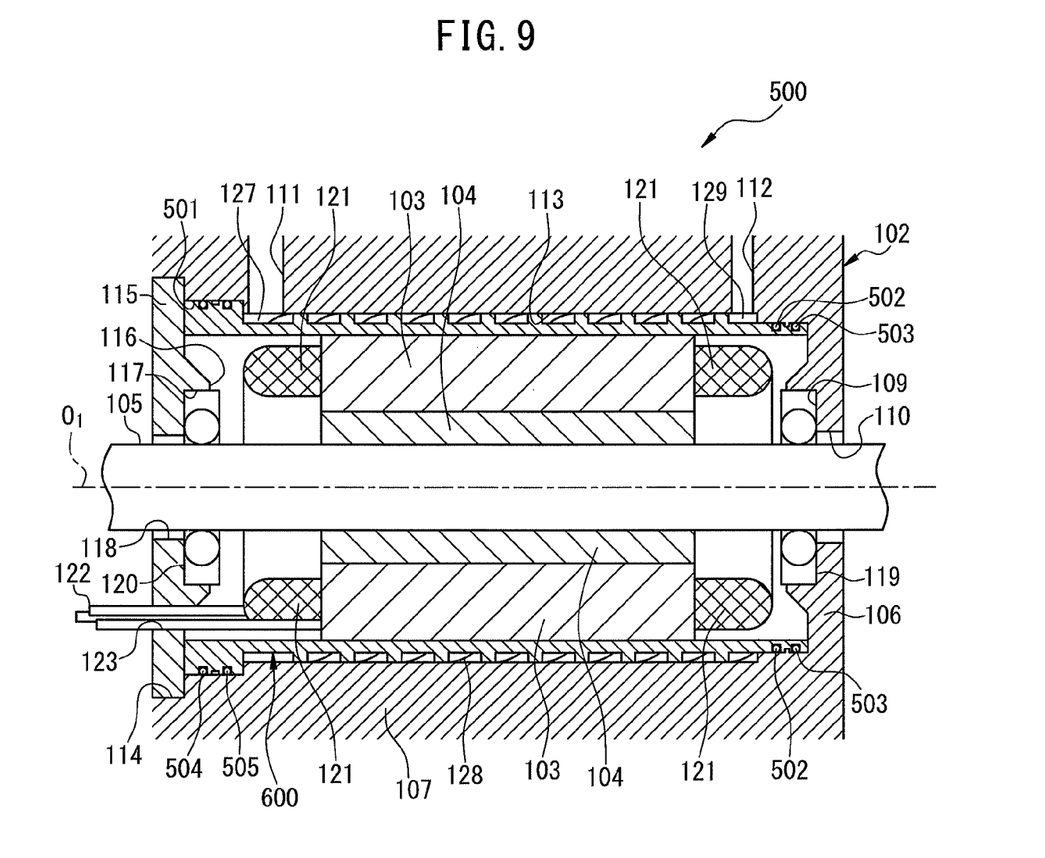
FIG. 9 is a cross-sectional view of an electric motor according to still another embodiment of the present invention.
Figure 10:
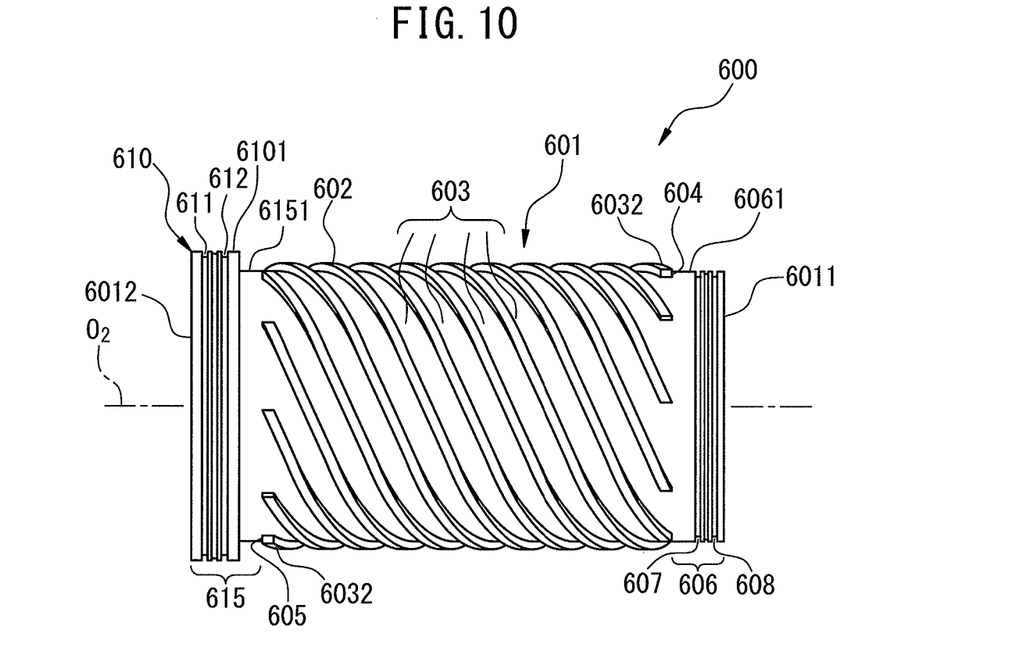
FIG. 10 is a side view of a cooling jacket illustrated in FIG. 9.
Figure 11:
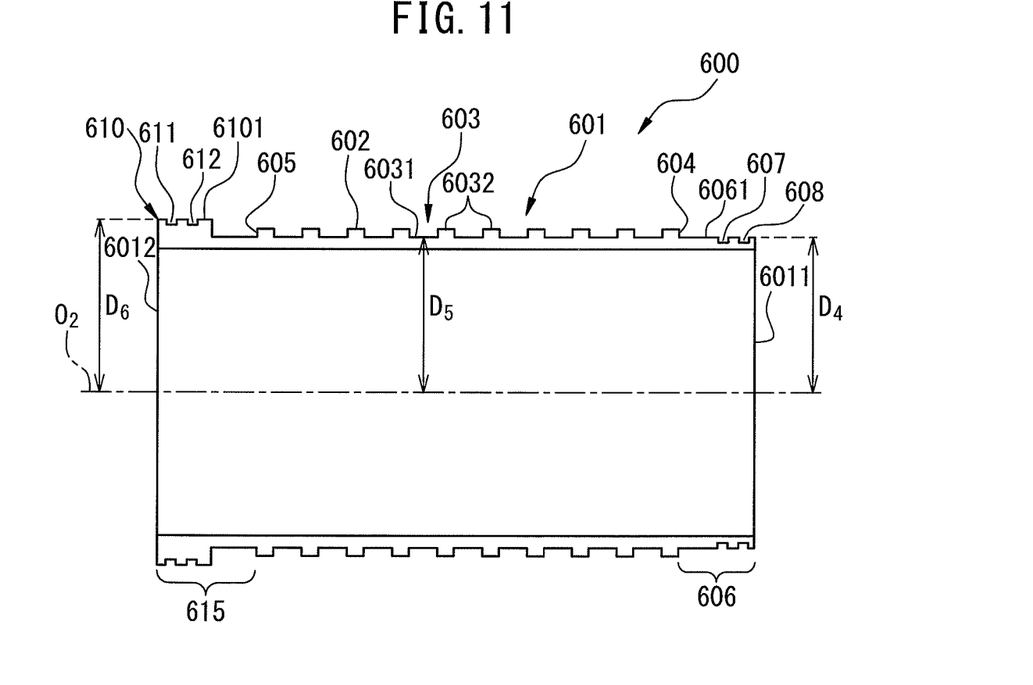
FIG. 11 is a cross-sectional view of the cooling jacket illustrated in FIG. 9.

Next, with reference to FIG. 9 to FIG. 11, an electric motor 500 according to still another embodiment of the present invention will be described. The same signs are assigned to the same members as in the aforementioned embodiment and detailed description will be omitted. The electric motor 500 includes a housing 102, a stator 103, a rotor 104, and a rotary shaft 105, and also a cooling jacket 600.

The cooling jacket 600 includes a cylindrical main body 601 having a center axis $O_2$, a groove unit 603 formed so as to be recessed radially inward from an outer periphery 602 of the main body 601, and a flange unit 610 which is disposed at the end portion of an axial front side and which is diameter-enlarged radially outward from the main body 601. The main body 601 includes a first end face 6011 of an axial rear side and a second end face 6012 of an axial front side.

The groove unit 603 is formed with an eight-thread spiral groove, and each groove in the groove unit 603 having a total of eight threads successively extends in a spiral manner from a groove end portion 604 of an axial rear side to a groove end portion 605 of an axial front side. More specifically, each groove in the groove unit 603 is defined by a bottom 6031 of the groove unit 603 and wall faces of two protruding threads 6032 adjacent to each other. Each of the protruding threads 6032 protrudes radially outward from the bottom 6031 of the groove unit 603 and successively extends axially from the first groove end portion 604 to the second grove end portion 605 in a spiral manner.

In the present embodiment, the first groove end portion 604 of the groove unit 603 is defined by an axial rear end of the protruding thread 6032 defining the groove unit 603. Similarly, the second groove end portion 605 of the groove unit 603 is defined by an axial front end of the protruding thread 6032 defining the groove unit 603. The respective grooves in the groove unit 603 are circumferentially arrayed in the main body 601 at substantially equal intervals. The groove unit 603 defines a flow channel through which a cooling medium for cooling the stator 103 passes.

In the cooling jacket 600 according to the present embodiment, the main body 601 includes a first end region 606 where no groove unit is formed, between the first groove end portion 604 of an axial rear side of the groove unit 603 and the first end face 6011 of the main body 601. On the other hand, the main body 601 includes an end region 615 where no groove unit is formed, between the second end portion 605 of an axial front side of the groove unit 603 and the second end face 6012 of the main body 601. The second end region 615 includes the aforementioned flange unit 610 and a cylindrical outer periphery 6151 formed between the flange unit 610 and the second groove end portion 605.

In the first end region 606, recesses 607 and 608 that are recessed radially inward from the outer periphery 6061 of the first end region 606 are formed, and the recesses 607 and 608 extend circumferentially over the entire circumference of the main body 601 so as to be parallel to each other. As illustrated in FIG. 9, in a state where the electric motor 500 has been assembled, O-rings 502 and 503 are inserted in the recesses 607 and 608, respectively, to seal a gap between the cooling jacket 600 and the housing 102.

Further, in the flange unit 610, recesses 611 and 612 recessed radially inward from the outer periphery 6101 of the flange unit 610 are formed, and the recesses 611 and 612 extend circumferentially over the entire circumference of the flange unit 610 so as to be parallel to each other. As illustrated in FIG. 9, in a state where the electric motor 600 has been assembled, the flange unit 610 is inserted in the recess 501 that is formed so as to be recessed radially outward from the inner periphery 113, in the end portion of the axial front side of the side wall portion 107 of the housing 102. O-rings 504 and 505 are inserted in the recesses 611 and 612 of the flange unit 610 to seal a gap between the cooling jacket 600 and the housing 102.

The outer periphery 6061 of the first end region 606 is formed so as to have an outer radius equal to or smaller than a radial distance between the bottom 6031 of the grove part 603 and the center axis $O_2$ of the main body 601. More specifically, as illustrated in FIG. 11, the outer radius of the outer periphery 6061 of the first end region 606 is designated as $D_4$ and the radial distance between the bottom 6031 of the grove part 603 and the center axis $O_2$ of the main body 601 is designated as $D_5$. In this case, $D_4$ and $D_5$ are set to satisfy the relationship: $D_4$ $D_5$. In the present embodiment, the outer radius $D_4$ of the first end region 606 is substantially equal to the aforementioned radial distance $D_5$. In other words, $D_4 \approx D_5$.

Further, in the present embodiment, the flange unit 610 is formed so as to be diameter-enlarged radially outward from the main body 601 and has an outer radius $D_6$ larger than the outer radius $D_4$ of the first end region 606 and the aforementioned radial distance $D_5$. In other words, $D_6 D_4 D_5$. The outer periphery 6151 formed between the flange unit 610 and the second groove end portion 605 may have an outer radius equal to or smaller than the radial distance $D_5$.

Next, a method for producing the cooling jacket 600 according to the present embodiment will be described. First, the cylindrical main body 601 including the first end face 6011 and the second end face 6012 is prepared. Then, the main body 601 is placed in a bobbing machine and rotated around the center axis $O_2$ of the main body 601.

Next, the main body 601 is cut from the first end face 6011 of the main body 601 to a predetermined axial position so as to be recessed radially inward from the outer periphery 602 of the main body 601 to form the first end region 606 including the cylindrical outer periphery 6061. Then, the main body 601 is cut from the second end face 6012 of the main body 601 to a predetermined axial position to form the second end region 615 including the flange unit 610 and the outer periphery 6151.

Subsequently, a hob mounted in the bobbing machine is rotated and then the rotating hob is pressed into contact with the outer periphery 6151 in the second end region 615 of the main body 601. Then, the rotating hob is moved axially relative to the main body 601 from the second end region 615 of the body part 601 to the first end region 606 thereof to form the groove unit 603.

According to the cooling jacket 600 of the present embodiment, in order to form the groove unit 603, a cutting tool is relatively moved axially backward (specifically, toward the first end region 606) from an axial front side (specifically, the outer periphery 6151 of the second end region 615) of the main body 601, making it possible to prevent the top of the cutting tool from interfering with the main body 601. This makes it possible to form the groove unit 603 in the main body 601 efficiently and uniformly, resulting in improvement in the production efficiency of the cooling jacket 600.

Further, the cutting tool may be prevented from colliding with a member of the cooling jacket 600 during machining. This makes it possible to prevent the cutting tool from breaking, as well as damaging the cooling jacket 600.

Further, according to the present embodiment, a hob may be employed to form the groove unit 603. This makes it possible to form the groove unit 603 having a larger number of threads simultaneously in the main body 601, resulting in a reduction in machining time. As a result, production efficiency may be further improved.

Further, since it is possible to form the groove unit 603 having a larger number of threads in the main body 601 in such manner, the total surface area of the groove unit 603 may be increased. As a result, the cooling performance of the cooling jacket 600 may be improved. In addition, since a depth of each groove is allowed to be shallower, a cutting amount of the main body 601 may also be reduced.

Further, according to the present embodiment, in an operation such as fitting the cooling jacket 600 into the stator 103, the cooling jacket 600 may be easily conveyed by nipping the flange unit 610. This makes it possible to improve operation efficiency.

Further, according to the present embodiment, a configuration is employed in which the O-rings 502, 503, 504, and 505 for sealing a gap between the cooling jacket 600 and the housing 102 are housed in the recesses 607, 608, 611, and 612, that are formed in the cooling jacket 600. Therefore, it is not necessary to apply machining for forming recesses to members other than the cooling jacket 600 such as the housing 102, which results in reduction of production cost.

In the cooling jacket 200 illustrated in FIG. 1 to FIG. 3, a case has been described where the outer peripheries 2061 and 2071 of the first end region 206 and the second end region 207 are formed so as to have the outer radiuses $D_1$ and $D_2$ that are substantially equal to the radial distance $D_3$ between the bottom 2031 of the groove unit 203 and the center axis $O_2$ of the main body 201 (i.e., $D_1 \approx D_2 \approx D_3$). However, the present invention is not limited thereto, and the outer periphery of the first end region and/or the second end region may be formed so as to have an outer radius smaller than the radial distance between the bottom of the groove unit and the center axis of the main body.

This configuration will be briefly described below with reference to FIG. 12. In a cooling jacket 700 illustrated in FIG. 12, a small diameter portion 7062 recessed radially inward from an outer periphery 7061 of a first end region 706 is formed in the first end region 706 between a first groove end portion 704 of a groove unit 703 and a first end face 7011 of a main body 701. The small diameter portion 7062 is disposed so as to successively exist in a circumferential direction of the outer periphery 7061 of the first end region 706.

On the other hand, a small diameter portion 7072 recessed radially inward from an outer periphery 7071 of a second end region 707 is formed in the second end region 707 between a second groove end portion 705 of the groove unit 703 and a second end face 7012 of the main body 701. This small diameter portion 7072 is disposed so as to successively exist in a circumferential direction of the outer periphery 7071 of the second end region 707.

Figure 6:
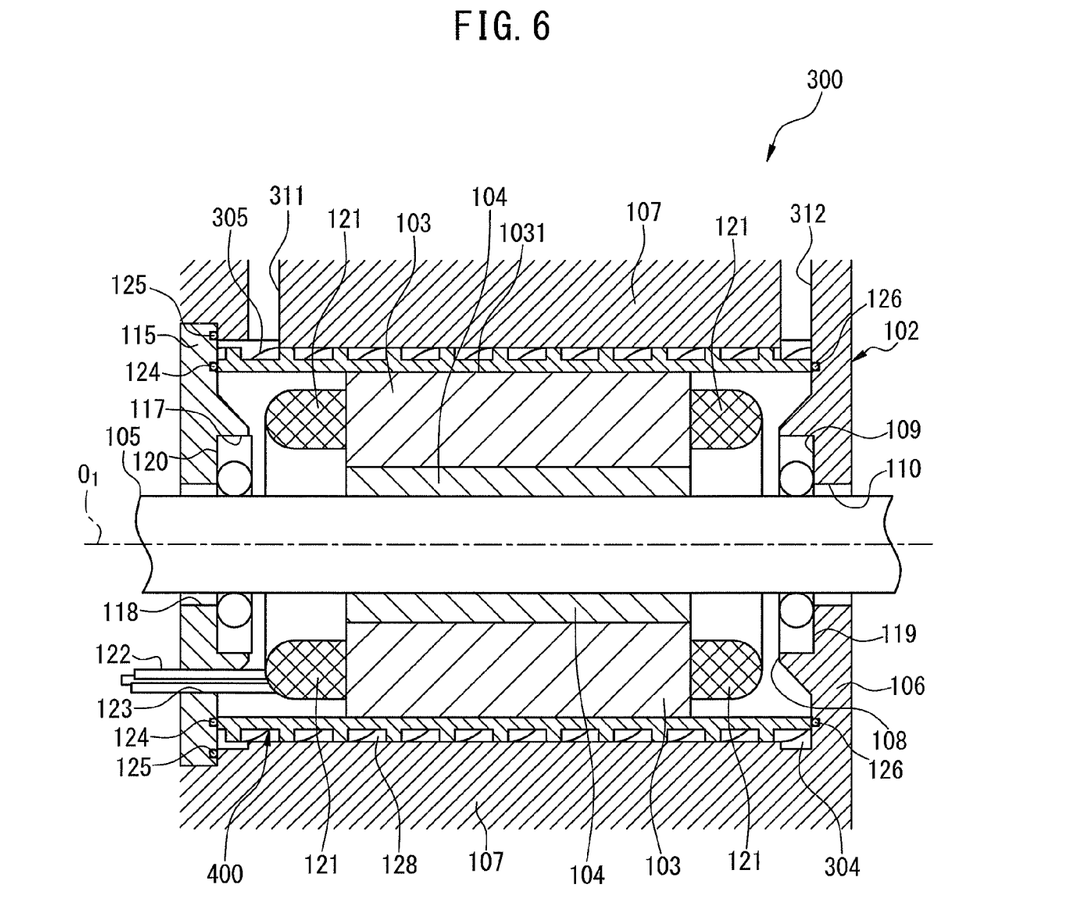
FIG. 6 is a cross-sectional view of an electric motor according to another embodiment of the present invention.
Figure 7:
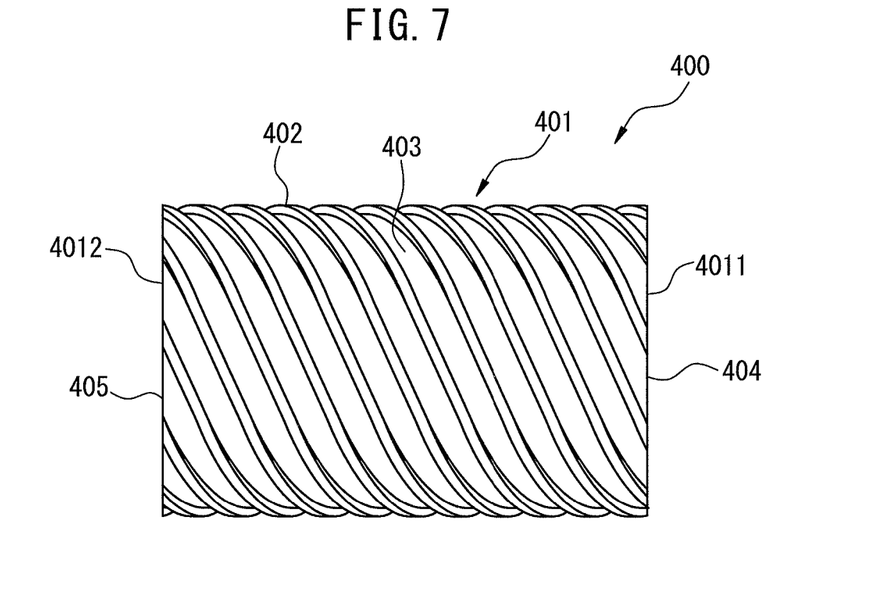
FIG. 7 is a side view of a cooling jacket illustrated in FIG. 6.
Figure 8:
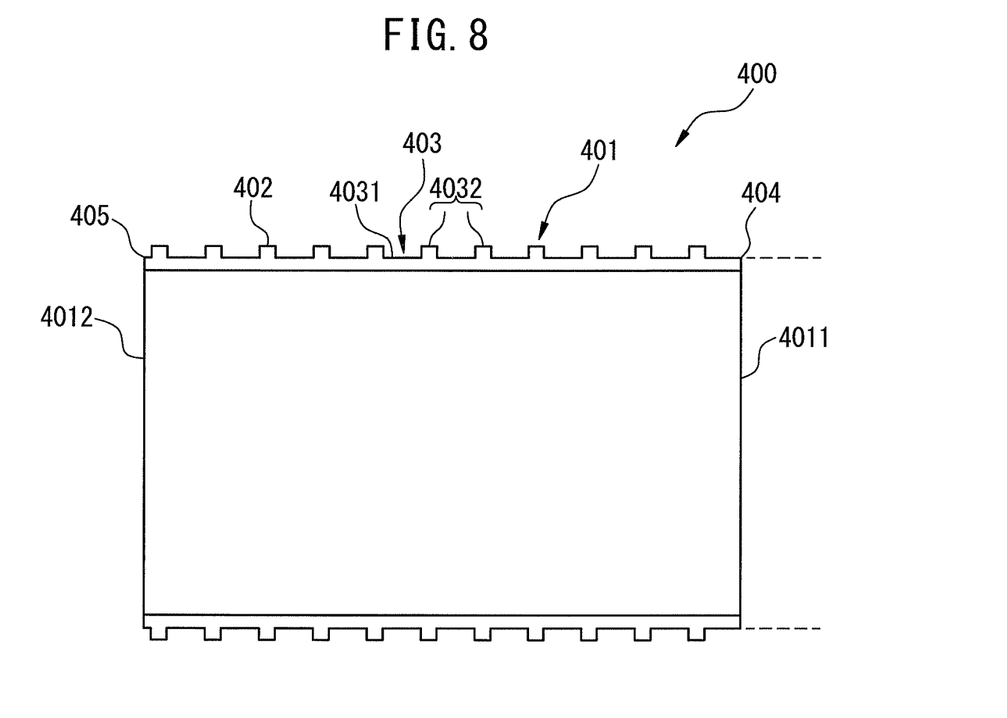
FIG. 8 is a cross-sectional view of the cooling jacket illustrated in FIG. 6.

Further, in the embodiment illustrated in FIG. 6 to FIG. 8, a case has been described where the groove unit 403 extends to the first end face 4011 and the second end face 4012 of the main body 401. However, the present invention is not limited thereto, and it is possible for the groove unit to extend to an end face on one side of the axial direction of the main body. In addition, in an end portion on the other side of the axial direction of the main body, an end region as described in the aforementioned embodiment may be formed.

This configuration will be briefly described below with reference to FIG. 13. In a cooling jacket 800 illustrated in FIG. 13, a groove unit 803 extends from a first end face 8011 of a main body 801 to a second groove end portion 806 located on an axial rear side of a second end face 8012 of the main body 801. A second end region 807 where no groove unit is formed is formed between the second end face 8012 of the main body 801 and the second groove end portion 806 thereof. Similar to the aforementioned embodiment, an outer periphery 8071 of the second end region 807 may be formed so as to have an outer radius equal to or smaller than a radial distance between the bottom of the groove unit 803 and the center axis of the main body 801.

Figure 12:
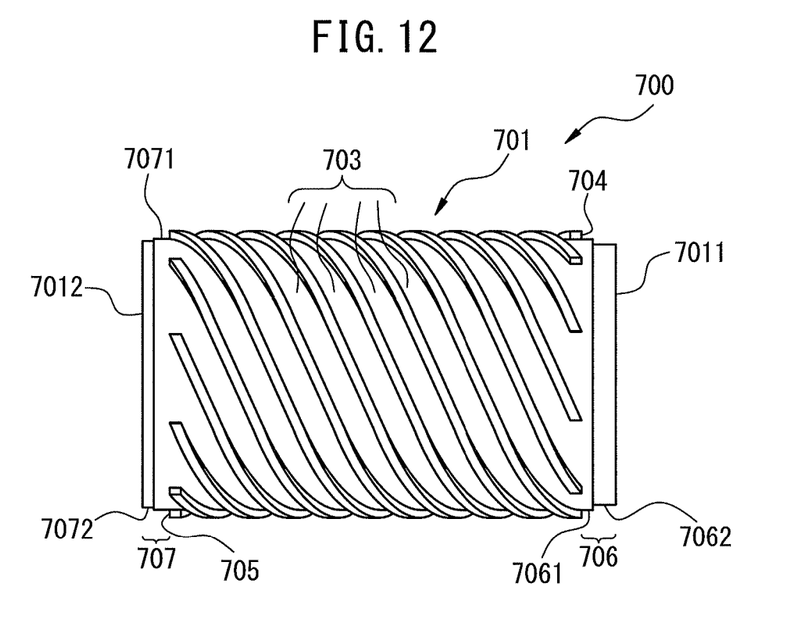
FIG. 12 is a side view of a cooling jacket according to further another embodiment of the present invention.
Figure 13:
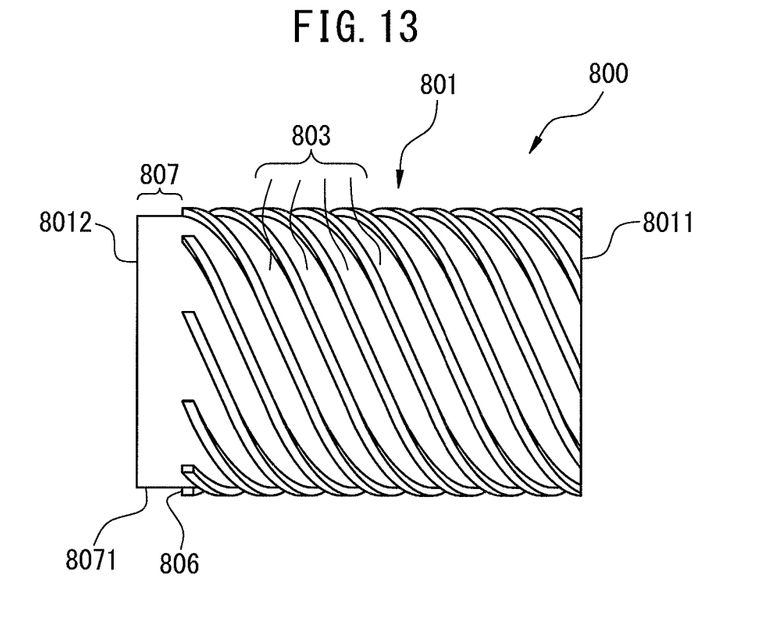
FIG. 13 is a side view of a cooling jacket according to yet another embodiment of the present invention.

Also, in the embodiment illustrated in FIG. 12 and FIG. 13, when a groove unit is formed, the cutting tool may be moved smoothly to an axial end portion of the main body. Therefore, similar to the aforementioned embodiments, the production efficiency of the cooling jacket may be improved.

In the aforementioned embodiments, a case has been described where the cooling jacket is cylindrically shaped. However, the present invention is not limited thereto, and the cooling jacket may be a tubular member having a polygonal shape such as a hexagonal shape, an elliptical shape, or any other shape having an inner periphery.

Further, in the aforementioned embodiments, a case has been described where the first end region and the second end region are cylindrically shaped. However, the present invention is not limited thereto, and the first end region and/or the second end region may have any other shape such as a polygonal shape, an elliptical shape, a gear shape, a star shape, as long as no portion located radially outward from the bottom of the groove unit is included.

Further, in the aforementioned embodiments, a case has been described where the groove unit is formed as a spiral groove. However, the present invention is not limited thereto, and the groove unit may be formed so as to extend in a linear manner or in any curved manner. In addition, the groove unit may be a single-thread groove or a groove having any number of threads.

Further, the aforementioned cooling medium inlet and/or cooling medium outlet may be disposed in a side wall portion of the housing as a single member, or may be formed plurally in the side wall portion of the housing so as to be arrayed circumferentially at equal intervals. In addition, the cooling medium inlet and/or cooling medium outlet may be disposed so as to be arrayed circumferentially at arbitrary intervals. Further, the cooling medium inlet and/or cooling medium outlet may be formed so as to successively extend circumferentially.

In the aforementioned embodiments, a case has been described where the groove unit is formed so that the cooling medium flows axially in one direction from the cooling medium inlet disposed on an axial front side to the cooling medium outlet disposed on an axial rear side. However, the present invention is not limited thereto, and the groove unit may be formed so that, for example, both the cooling medium inlet and the cooling medium outlet are disposed on the axial front side to cause the cooling medium to flow circularly from the axial front side to the axial rear side and then from the axial rear side to the axial front side.

In addition, in the aforementioned embodiments, a case has been described where the cooling jacket according to the present invention is applied to an electric motor. However, the present invention is not limiter thereto, and the cooling jacket according to the present invention is applicable, for example, to a rotary electric machine such as an electric generator.

The present invention has been described through the embodiments of the invention, but the aforementioned embodiments do not limit the invention according to the scope of the appended claims. Further, all combinations of features described in the embodiments are not necessarily essential to the solving means of the invention. Further, it is apparent to those skilled in the art that various modifications or improvements can be made to the aforementioned embodiments. It is apparent from the description of the scope of the appended claims that embodiments with such modifications or improvements also fall within the technical range of the present invention.

What is claimed is:

1. A cooling jacket on a radial outside of a stator of a rotary electric machine, the cooling jacket comprising:
   a tubular main body including a first end face of one axial side and a second end face of the other axial side; and
   a groove unit defining a flow channel of a cooling medium, the groove unit being successively disposed axially on an outer periphery of the main body,
   wherein the cooling jacket includes no portion located radially outward from a bottom of the groove unit between a first end portion of the groove unit on the one axial side of the main body and the first end face of the main body and between a second end portion of the groove unit on the other axial side of the main body and the second end face of the main body,
   wherein the groove unit is a multi-thread groove successively extended axially on the main body in a spiral manner.

2. The cooling jacket according to claim 1, comprising a cylindrical outer peripheral region having an outer radius equal to or smaller than a radial distance between the bottom of the groove unit and a center axis of the main body, the region being located between the first end portion of the groove unit and the first end face of the main body.

3. The cooling jacket according to claim 1, comprising a cylindrical outer peripheral region having an outer radius equal to or smaller than a radial distance between the bottom of the groove unit and a center axis of the main body, the region being located between a second end portion of the groove unit on the other axial side of the main body and the second end face of the main body.

4. The cooling jacket according to claim 1, wherein the groove unit is formed by hobbing.

5. A stator comprising the cooling jacket according to claim 1.

6. A rotary electric machine comprising the stator according to claim 5.

7. A method for producing a cooling jacket on a radial outside of a stator of a rotary electric machine, the method comprising steps of: preparing a tubular main body including a first end face of one axial side and a second end face of the other axial side; rotating the main body around a center axis of the main body; pressing a rotating hob against an outer periphery of the main body; and moving the rotating hob axially relative to the main body between a first end portion of the one axial side of the main body and a second end portion of the other axial side of the main body to form a groove unit defining a flow channel of a cooling medium, the groove unit being a multi-thread groove successively extending axially on the outer periphery of the main body in a spiral manner.

8. The production method according to claim 7, further comprising step of cutting the main body from the first end face of the main body to a predetermined axial position before pressing the rotating hob, in order to form a cylindrical outer peripheral region having an outer radius equal to or smaller than a radial distance between the bottom of the groove unit and the center axis of the main body.

9. The production method according to claim 7, further comprising a step of cutting the main body from the first end face of the main body to a predetermined axial position after forming the groove unit, in order to form a cylindrical outer peripheral region having an outer radius of equal to or smaller than a radial distance between the bottom of the groove unit and the center axis of the main body.

10. The cooling jacket according to claim 1, wherein the groove unit extends to at least either the first end face or the second end face of the main body.

* * * * *